United States Patent [19]

Nuss

[11] 4,202,702

[45] May 13, 1980

[54] INORGANIC PIGMENT COMPRISING A SOLID SOLUTION OF DIFFERING SPINELS

[75] Inventor: James W. Nuss, Rocky River, Ohio

[73] Assignee: Ferro Corporation, Cleveland, Ohio

[21] Appl. No.: 972,707

[22] Filed: Dec. 26, 1978

[51] Int. Cl.$^2$ .......................... C09C 1/00; C09C 1/22; C09C 1/36; C09C 1/40

[52] U.S. Cl. ................................ 106/288 B; 106/292; 106/296; 106/299; 106/301; 106/302; 106/304; 106/306

[58] Field of Search ..................... 106/288 B, 299, 300, 106/304, 302; 252/62.61; 423/594

[56] References Cited

U.S. PATENT DOCUMENTS

| | | | |
|---|---|---|---|
| 3,876,441 | 4/1975 | Broll et al. | 106/299 |
| 4,075,029 | 2/1978 | Nuss | 106/304 X |

FOREIGN PATENT DOCUMENTS 287007 3/1953 Switzerland .......................... 252/62.61

*Primary Examiner*—Helen M. McCarthy
*Attorney, Agent, or Firm*—Wilson, Fraser, Barker & Clemens

[57] ABSTRACT

An inorganic pigment is disclosed comprising a solid solution of a solvent spinel containing a solute of a differing spinel, characterized in that the solvent spinel is lithium based and has a highly ordered structure. The solvent spinel is that lithium-based varient of the cubic spinel phase having a uniform cubic ordering of metal cations about at least the tetrahedral or the octahedral sites of symmetry in the spinel lattice. The ordering of the metal cations with respect to either the tetrahedral or octahedral sites, and preferably both, is in ionic ratios of whole numbers and comprises two different metal ions of differing charges.

16 Claims, No Drawings

INORGANIC PIGMENT COMPRISING A SOLID SOLUTION OF DIFFERING SPINELS

BACKGROUND OF THE INVENTION

Pigments are widely used in many industries to impart basically a pleasing, esthetic color and appearance to various media in which they are mixed, such as paints, varnishes, organic resins, glazes, ceramic ware such as porcelain enamels, and the like. As a general rule, inorganic pigments have a greater scope of application as compared to organic pigments. Because of the more severe and drastic conditions of use in glazes and ceramic applications, particularly with reference to temperature of preparation, inorganic pigments must be used for such applications. However, inorganic pigments may also be added to organic media, such as organic resinous polymeric materials, especially when such materials are used at relatively high temperature such as in extruding or molding.

It is known to use a single spinel as an inorganic pigment. Crystallographically, spinels are face-centered cubes of oxygen ions into which metal ions can be located in either tetrahedral or octahedral coordination spheres. Spinels comprise metal oxides in recognized groupings, usually expressed by formulas. A normal spinel crystal structure, for example, may be expressed as $AB_2O_4$ in which A may represent one ion or atom of a divalent metal and B represents two ions of a trivalent metal. It will be noted that the sum of the metal positive valences, eight, equals the total negative valence of the oxygen to maintain the spinel in electrical neutrality.

Prior work for developing spinels as inorganic pigments has been confined to the substitution of metal ions of similar charge in a host crystal system. There are two ways in which the substituted metal ion can fit into the spinel crystal structure. In one, the substituted ion fits into an occupied or unoccupied tetrahedral site within the crystal. In another, the substituted ion fits into an occupied or unoccupied octadedral position in the host structure. While the resulting spinel crystal lattice structures in both instances have been referred to as solid solutions, they actually consist of only an original, single spinel crystal structure with one or more metal ions substituted in crystal sites normally occupied by other metal ions.

Thus, U.S. Pat. No. 2,139,686 to Lederle discloses forming crystals of the spinel type from meta and ortho zinc titanate compositions in which a part of the zinc can be isomorphorically replaced by magnesium. Similarly, although U.S. Pat. No. 3,424,551 to Owen speaks of a pigment having a characteristic spinel structure and describes these spinels as solid solutions, this patent also shows that only a single spinel crystal structure is intended by disclosing only one spinel formula, and by stating that the spinels pertaining to the invention of that patent may be represented by the formula $A^xB^y{}_2O_4$, in which the ionic charges of the A and B cations are such that the sum of these charges $(1x+2y)$ equals eight; (column 1, lines 36 to 39). In like manner, U.S. Pat. No. 3,876,441 to Broll et al discloses a pigment having a spinel structure but limited to an alkali metal titanate in which cobalt, zinc and cadmium are substituted in varying amounts, the ion substitutions of the three metals totaling one per molecule of the spinel, as expressed by a single formula, and in which tin may also be substituted for up to 10 moles percent of the titanium.

In short, all of the three previously identified patents relate only to a spinel crystal system in which metal ion substitutions may be made, that is, one metal ion for another.

U.S. Pat. No. 4,075,029 to applicant advanced the art by disclosing an inorganic pigment and its process of manufacture, characterized in that the pigment, in contrast to substitution of one or more metal ions into a given spinel crystal structure, is a solid solution comprising at least a double spinel structure. More particularly, a first cubic spinel crystal structure contains within its lattice the spinel-forming metal oxides of at least a second, differing spinel. As a result, the multiple spinel solid solution pigments of U.S. Pat. No. 4,075,029 can be varied over a wide range of compositional makeup and yet, conversely, easily adjust to even slight compositional changes by varying the amounts or components of the first spinel and/or the spinel forming metal oxides.

SUMMARY OF THE INVENTION

The principal object of the present invention is to provide an improved inorganic pigment based on multiple spinels. The present pigments are not solid solutions of a single crystal structure with metal ions substituted for other metal ions. Rather, the pigments are solid solutions similar to those described in my U.S. Pat. No. 4,075,029, namely, of a solvent cubic spinel structure and solute spinel-forming metal oxides of at least one other differing spinel.

In the course of further study on multiple spinels, it has been discovered that when the metal cations within the solvent spinel are in ratios of whole numbers, and the ordering of these cations occurs on the tetrahedral or octahedral metal ion sites, and preferably on both sites, such ordering leads to increased color saturation and cleanliness of the pigment. These improvements in color are thought to be due to a preciseness in the d-d orbital splittings.

More particularly, ordered variants of the spinel phase which retain cubic symmetry lead to cubic solid solutions with spinel-forming oxide combinations. These solid solutions exhibit brilliant colors when transiton metal ions are incorporated into the cubic ordered solid solution. In the present improvement, it has been found that the solvent spinel should be lithium-based, and the metal ions distribute themselves in at least one of the tetrahedral or octahedral sites of the solvent spinel, and preferably both, in ionic ratios of whole numbers and comprise two different metal ions of differing charges or valences. The environment around those ions of the spinel lattice which principally generate color is accordingly exactly the same, and the resulting color thus generated is purer.

In an accurate and genuine sense, the present spinel solid solution comprises a solvent, lithium-based spinel containing within its crystal the spinel-forming metal oxides of at least a second, differing spinel as a solute spinel. Preferably, the lithium-based solvent spinel is selected from the group consisting of:

(a) $Li^{+1}A_5{}^{+3}O_8$ in which A is Al, Fe or Ga,
(b) $Li^{+1}B^{+2}C_3{}^{+4}O_8$ in which B is Co, Zn, Mn, Cd, or Mg, and C is Ti or Ge, and
(c) $Li^{+1}D^{+3}Cr_4{}^{+3}O_8$ in which D is Al or Fe.

The spinel-forming metal oxides of any additional spinel present may broadly correspond to any known spinel formula as long as the oxides are added in amounts to satisfy the ionic ratios of whole numbers and comprise two different metal ions of differing charges of valences.

The multiple spinel pigments of the present invention are prepared as described in my U.S. Pat. No. 4,075,029. For example, with respect to forming a double spinel, the calcining operation may be based on two preformed spinels, or on one preformed spinel and a charge of spinel-forming components; or on two charges of spinel-forming components. In the last case, one charge survives as the cubic spinel crystal structure, and the second charge defines the spinel-forming metal oxides dissolved within the crystal of the first spinel. The spinel defining the solvent host crystal structure has a sufficiently large lattice constant to receive the other spinel entity or entities. A calcining temperature is dictated by the physical properties of the spinels being used, but usually extends from about 750° C. to a temperature short of which the calcining materials melt.

DESCRIPTION OF THE PREFERRED EMBODIMENTS

In general, a pigment of the present invention comprises a lithium-based host spinel crystal structure, sometimes herein designated as the solvent or first spinel, into which are incorporated the spinel-forming metal oxides present in a ratio or proportions inter se that are adapted to lead to spinel formation, sometimes herein designated as the solute or second spinel. The two spinels together constitute the solid solution, preferably only in a single phase, which defines the present pigment.

The spinel crystal phase may actually exist as several varients, namely, the tragonal varient, the orthorhombic varient, and the cubic varient. Only the cubic varient is contemplated for the solvent spinel.

A unit cell of a cubic spinel crystal structure has 32 octahedral sites of which 8 are normally occupied, and 64 tetrahedral sites of which 16 are normally occupied. In accordance with the present invention, some or all of the available sites are occupied by adding (not substitution) spinel-forming metal oxides present in proportion adapted to form at least a second spinel, while meeting the required uniform cubic ordering of metal cations with respect to either or both of the tetrahedral and octahedral sites of the lattice of the solvent spinel crystal. These requirements include the added metal ions' being in ionic ratios of whole numbers and comprising two different metals with respect to each of the tetrahedral and octahedral sites having differing charges or valences. By analogy, the solvent spinel may be likened to a sponge which absorbs another medium, represented by the spinel-forming metal oxides.

As indicated, a cubic spinel crystal lattice has both tetrahedral and octahedral site symmetry. It is about one, and preferably both, of these sites that the highly ordered structure herein contemplated takes place. It is possible to predict where some metal ions will go. Some metals, like cobalt and zinc, actually prefer to be positioned in a tetrahedral site. Other metals, like nickel and titanium, prefer an octahedral site. Still other metals like lithium prefer neither and can go to either site.

If there is a random ordering of metal ions about the tetrahedral or octahedral sites, spinel solid solutions are obtained which are useful as pigments. However, due to the random ordering, those ions which generate color, such as nickel or cobalt, absorb minutely different wave lengths of light, and the resulting color is less pure or clean. In the present improvement, by means of the described uniform, highly ordered system of orienting metal ions about the tetrahedral and/or octahedral sites, the substructure or environment around the ions which generate color is identically the same for all or appreciably all of the sites occupied. As a result, the color generated is purer and cleaner and more brilliant.

Improved color results are, therefore, possible when either the tetrahedral or octahedral sites of symmetry are highly ordered as described. But is is preferred that both tetrahedral and octahedral sites be highly ordered to achieve even greater color in brilliance, that is greater color saturation or color intensity.

In accordance with the present pigments, the solvent or the first spinel is lithium-based and selected from the group consisting of:

(a) $Li^{+1}A_5^{+3}O_8$ in which A is Al, Fe or Ga,
(b) $Li_2^{+1}B^{+2}C_3^{+4}O_8$ in which B is Co, Zn, Mn, Cd, or Mg, and C is Ti or Ge, and
(c) $Li^{+1}D^{+3}Cr_4^{+3}O_8$ in which D is Al or Fe.

For example, the lithium-based solvent spinel may correspond to one of the following formulas:

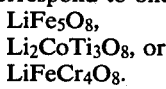

$LiFe_5O_8$ may be considered as $(Fe_2)(LiFe_3)O_8$ which embodies a metal ion ratio of 3:1 on the octahedral sites. $Li_2CoTi_3O_8$ may be considered as $(LiCo)(LiTi_3)O_8$ which embodies a metal ion ratio of 1:1 on the tetrahedral sites, and a metal ion metal ratio of 1:3 on the octahedral sites. $LiFeCr_4O_8$ may be considered as $(LiFe)(Cr_4)O_8$ which embodies a metal ion ratio of 1:1 on the tetrahedral sites. The spinel-forming oxides added to the solvent or host spinel and which constitute the solute spinel may correspond to a number of other different spinel formulas, as long as the solute spinel is different in composition from the solvent spinel.

Examples of the added solute spinel that may be used are:

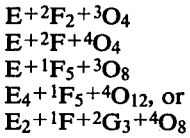

in which E, F and G are ions of metals having a valence indicated by the associated exponents, and in which each of E, F and G of the solute spinel has an ionic radius no greater than 1:1 angstroms. The solvent and solute spinels are present in all proportions forming a single phase solid solution. The total positive charge of the metals ions in any one of the formulas, either for the solvent or solute spinels, equals the total negative valence charge of the oxygen to maintain electrical neutrality.

Literally, any known metal ion listed in Periodic Table of the Elements can be used as the metal in the spinel forming metals oxides, as long as the metal has an ionic radius no greater than 1.1 angstroms. A limiting ionic radius arises for additive spinel metal oxides, because ionic radii of metals greater than about 1.1 angstroms simply cannot physically fit within the solvent spinel crystal structure. Examples of limiting ionic radii are those for sodium which has an ionic radius of about 1.0 angstrom and cadmium which has an ionic radius of about 1.1 angstroms.

The preferred spinel-forming metal oxides contain only certain metal ions. Referring to the previously indicated spinel formulas for the solute spinels, preferably E is a monovalent metal ion selected from the group consisting of Li, or a divalent metal ion selected from the group consisting of Mg, Mn, Fe, Co, Ni, Cu, Zn, and Cd; preferably F is a divalent metal ion selected from the group consisting of Mg, Cu, Mn, Fe, Co, Ni, Zn, and Cd; or a trivalent metal ion selected from the group consisting of Al, Cr, Fe, Ga, In, La, and V; or a tetravalent metal ion selected from the group consisting of Ti, Sn, Mn, V, and Ge; and G is a tetravalent metal ion selected from the group consisting of Ti, Sn, Mn, V, and Ge. The total positive charge of the metal ions in any of the formulas equals the total negative charge of oxygen to maintain electrical neutrality.

In general, the first or solvent spinel crystal structure may be considered to be the host or solvent and is usually, but not necessarily, present in greater amount, and the spinel-forming metal oxides may be considered the additive or solute. As a rule, relative proportions are not critical. As long as bout 0.5 mole percent of one spinel entity is present with the other, advantages of the present invention may be obtained. Most pigment compositions contain a mole percent from about 50% to about 99% of the solvent spinel crystal structure, and from about 1% to about 50% of the spinel-forming metal oxides of the second, solute spinel.

The two spinel entities are present preferably only as a single phase solid solution. This means that for any given system, if a single phase is to be preserved, the solute spinel-forming metal oxides can be added to the solvent spinel only up to limits of saturation permitted by that system. If more solute spinel is then added, a double phase solid solution forms. The presence of such a double or multiple phase system does not necessarily destroy the effectiveness of the desired single phase pigment, although it is preferred that the pigment be entirely single phase.

It is possible to represent a particular given multiple spinel pigment by a formula, since the ultimate pigment structure results from the combination of at least two spinel formulas, and are highly ordered together in solid solution as described. Examples of the present pigments include the following equations in which the first formula on the left is that of the solvent spinel, and the second formula is that of the solute spinel, the combination yielding the solid solution indicated at the right hand end of the equation.

$$LiAl_5O_8 + CoAl_2O_4 = LiAl_7CoO_{12} \quad (1)$$

The solid solid solution may be considered as $(LiAlCo)(Al_6)O_{12}$ which embodies a metal ion ratio of 1:1:1 on tetrahedral sites as to the Li, Al and Co. The metal ions are different and have differing charges.

$$LiAlCr_4O_8 + CoAl_2O_4 = LiAl_3CoCr_4O_{12} \quad (2)$$

The solid solution may be considered as $(LiCoAl)(Al_2Cr_4)O_{12}$ which embodies a metal ion ratio of 1:1:1 on the tetrahedral sites as to the Li, Co and Al.

$$LiAlCr_4O_8 + Co_2TiO_4 = LiAlCo_2Cr_4TiO_{12} \quad (3)$$

The solid solution may be considered as $(Co_2Li)(TiAlCr_4)O_{12}$ which embodies a metal ion ratio of 2:1 as to the Co and Li on the tetrahedral sites, and a metal ion ratio of 1:5 as to the Ti, Al, and Cr on the octahedral sites.

$$Li_2CoTi_3O_8 + Ni_2TiO_4 = Li_2CoTi_4Ni_2O_{12} \quad (4)$$

The solid solution may be considered as $(Li_2Co)(Ni_2Ti_4)O_{12}$ which embodies a metal ion ratio of 2:1 as to Li and Co on the tetrahedral sites, and a metal ion ratio of 2:1 as to Ni and Ti on the octahedral sites.

$$Li_4Ti_5O_{12} + CoAl_2O_4 = Li_4CoTi_5Al_2O_{16} \quad (5)$$

The solid solution may be considered as $(Li_3Co)(LiTi_5Al_2)O_{16}$ which embodies a metal ion ratio of 3:1 as to the Li and Co and no particular ordering as to the balance of the Li, Ti, and Al on the octahedral sites.

X-ray diffraction patterns on the solid solutions reveal many super structure lines indicating that the desired order exists.

The pigments are prepared as described in my Pat. No. 4,075,029 which is hereby incorporated by reference. In general, the pigments are prepared by forming a first or solvent spinel cubic cyrstal structure and dissolving within that structure the spinel-forming metal oxides of at least a second or solute spinel to form a solid solution of the spinel crystal lattice and the spinel-forming metal oxides. The spinel-forming oxides are present in proportions to correspond to the mentioned metal cation ordering desired.

Preferably, the preparation of a multiple spinel pigment comprises calcining together at a calcining temperature a mixture of at least two different charges of spinel-forming components. One charge survives as the first or solvent spinel crystal structure, and the other charge defines the spinel-forming metal oxides dissolved within that structure. However, it is possible to form pigments by calcining together at a calcining temperature a preformed spinel crystal structure, preferably conforming to the solvent spinel, and a charge of spinel-forming components which are, or convert to, the spinel-forming metal oxides that are dissolved within that structure to form a solid solution. It is also to form pigments by calcining together at a calcining temperature two preformed spinel crystal structures preferably conforming to the solvent and solute spinels, respectively. In any case, the materials are preferably intimately blended prior to calcination.

While it is possible to prepare the multiple spinel pigments directly from metal oxides as starting materials, the preferred practice is to use other metal compounds which are converted to oxide form by heat. Such other metal compounds include the hydroxides and the acid salts of the metals used, such as the nitrates, sulphates, sulfides, carbonates, acetates and the like. Compounds which are converted into oxides when heated in the presence of water, for example titanium chloride, may also be employed as starting calcining materials. As used here and in the claims, the term "spinel-forming components" and forms thereof mean the metal oxide itself or a metal compound capable of being converted by heat to the oxide state to form the spinel-forming metal oxides.

As a rule, if a preformed spinel is used at all, one is used to form the host or solvent cubic crystal, and, therefore, one which has a sufficiently large lattice constant to receive the other spinel entity. However, especially where charges of two preformed spinels are calcined together, the actual system which eventuates is largely determined by thermodynamic principles which favor that system of the present solid solutions having the lowest energy state, and, therefore, the spinels forming the solvent and solute spinels should be chosen accordingly.

The calcining temperature may extend from about 750° C. to a temperature just short of which the calcining materials melt. In general, the temperature does not usually exceed about 1350° C. The crystal form at relatively high temperatures and before the calcined mass cools. There is little or no residue from the calcining operation, especially if the amounts charged to calcination are in the proper respective quantities. If desired, standard ceramic fluxes can be included in the charge to calcination to lower the requisite calcining temperature. Such fluxes comprise sodium nitrate, calcium sulphate, boron oxide, sodium flouride, potassium fluoride, and the like.

It will be understood that minimum amounts of other ingredients can be present in the present pigments as a diluent, impurity, or other additive without losing the advantages of the present invention. Such diluents and the like may include any metal oxide which might not otherwise be present in one of the spinels of the multiple spinel pigments. Normally, a diluent, impurity or other additive can be present in an amount up to about 5% by weight of the pigment without seriously affecting the color. The diluent or other like material can be present in the pigment in two ways. It can be either physically admixed with the spinel outside the crystal structure, or the diluent can penetrate the lattice itself, interstitially or substitutionally.

The following examples are intended only to illustrate the invention and should not be construed to impose limitations on the claims.

EXAMPLES 1 THROUGH 4

Four solid solutions were prepared in accordance with the present invention and tested as to tristimulus values. The solid solutions were based on appropriate quantities of lithium carbonate, cobalt carbonate, and nickel carbonate. The three carbonates were weighed out and milled for one hour in a commercial aqueous grade of lower alkyl alcohols sold under the trademark "Synasol". After drying and blending, the samples were fired at 975° C. for three hours. Table A presents the compositional makeup of the starting materials and the chemical formulas of the resulting solid solutions.

The resulting green pigments were pebble milled for one hour in the alcoholic Synasol solution and paint drawdowns made. The average Fisher particle size after firing and milling was between 1.5 mu and 2.1 mu. These examples represent two spinel crystal lattices which are highly ordered together in solid solution.

TABLE A

| EXAMPLE | CHEMICAL FORMULA OF SOLID SOLUTION | $Li_2CO_3$ | $CoCO_3$ | $NiCO_3$ | ZnO | $TiO_2$ |
|---|---|---|---|---|---|---|
| 1 | $Li_2CoNi_2Ti_4O_{12}$ | 9.58% | 16.04% | 33.0 | — | 41.38% |
| 2 | $Li_2Co_{0.75}Zn_{0.25}Ni_2Ti_4O_{12}$ | 9.71 | 12.2 | 33.42 | 2.67 | 42.00 |
| 3 | $Li_2Co_{0.5}Zn_{0.5}Ni_2Ti_4O_{12}$ | 9.85 | 8.23 | 33.90 | 5.42 | 42.6 |
| 4 | $Li_2Co_{0.25}Zn_{0.75}Ni_2Ti_4O_{12}$ | 10.0 | 4.18 | 34.38 | 8.24 | 43.2 |

Table B summarizes the results and color values obtained when the solid solution pigments of Example 1 through 4 were mixed with a white tinting base paint and subjected to standard drawdown test on paint cards. The paint used for the test was a flat alkyd white manufactured by the Sherwin Williams Corporation under the trade designation, D64 WA 36. It is specially designed for testing pigments by drawdowns.

In preparing a pigment for the drawdown test, the pigment is mixed with an alkyd resin and subjected to a sandmill to obtain a good dispersion. The alkyd resin is manufactured by Ashland Chemical Company and sold under the trademark Aroplaz 1266-M-70. An amount of this pigment-resin mix was added to an amount of white paint, and a drawdown test carried out on the final mix. By knowing the weight of pigment in the pigment-resin mix and the amount of titania in the paint, definite ratios of pigment to titania could be achieved.

In Table B, "masstone" means the color of the pigment-resin mix with no titania present. A letdown of 0.5 means equal amounts of pigment and titania in the final mix. A letdown ratio of 4.5 means a titania to pigment ratio of 4.5 to 1 in the final mix. A letdown ratio of 9.5 means a titania to pigment ratio of 9.5 to 1 in the final mix. Tristimulus values were determined on the paint cards in a known manner.

The Hunter color values, L, a and b, are those conventionally calculated from the tristimulus values, where L is a measure of the reflectance, a is a measure of the redness-greenness, and b is a measure of the yellowness-blueness. U.S. Pat. No. 3,849,152 to Mimeault contains a more detailed description of these values. Table B also includes the results of the tristimulus values of the pigments of the four examples including their drawdowns with titania.

TABLE B

| EXAMPLE | LETDOWN RATIO $TiO_2$/PIGMENT | L | a | b | $\sqrt{a^2 + b^2}$ |
|---|---|---|---|---|---|
| 1 | masstone | 36.7 | −25.9 | +10.2 | 27.8 |
|   | 0.5 | 58.0 | −21.6 | + 5.0 | 22.1 |
|   | 4.5 | 77.1 | −14.6 | + 3.4 | 15.0 |
|   | 9.5 | 86.0 | − 9.5 | + 2.5 | 9.8 |
| 2 | masstone | 38.5 | −27.4 | +10.1 | 29.2 |
|   | 0.5 | 57.5 | −25.0 | + 6.2 | 25.7 |
|   | 4.5 | 76.7 | −16.9 | + 4.0 | 17.3 |
|   | 9.5 | 85.1 | −11.1 | + 2.9 | 11.4 |
| 3 | masstone | 42.1 | −30.3 | +11.8 | 32.6 |
|   | 0.5 | 59.9 | −26.8 | + 7.5 | 27.8 |
|   | 4.5 | 78.8 | −17.4 | + 4.6 | 18.0 |
|   | 9.5 | 86.3 | −11.7 | + 3.3 | 12.1 |
| 4 | masstone | 49.4 | −31.5 | +14.7 | 34.8 |
|   | 0.5 | 65.8 | −26.7 | +10.3 | 28.6 |
|   | 4.5 | 82.3 | −16.6 | + 6.5 | 17.9 |
|   | 9.5 | 88.9 | −10.5 | + 4.5 | 11.4 |

As is well known, the higher the value is for the square root of $a^2$ plus $b^2$ in the Hunter color values, the stronger or more intense the color and higher the color saturation. These values of Table B, it will be noted, are relatively high.

An absorptance spectrum of the pigment of Example 3 as a thin film clearly shows why the green colors of these pigments are so brilliant. There is a sharp window in the green at 525 microns surrounded on both sides by steep rises to less than 0.1% absorptance through the remainder of the ultraviolet visible region. The pigments of the examples are excellent for coil coating applications where ultraviolet light deterioration is otherwise a problem. Because of their extreme cleanliness, they can also be used to tint other shades while providing the ultraviolet protection. In particular, it will be noted that Examples 3 and 4 have excellent color saturation even though the cobalt content is low. Normally, the cobalt ingredient is the most expensive but necessary to generate the green shade provided by these pigments.

Although the foregoing describes several embodiments of the present invention, it is understood that the invention may be practiced in still other forms within the scope of the following claims.

I claim:

1. In a multiple spinel inorganic pigment comprising a solid solution of a solvent spinel containing within its crystal structure the spinel-forming oxides of at least a second, differing spinel as a solute spinel, the improvement in which said solvent spinel is that lithium-based variant of the cubic spinel phase having a non-random, uniform cubic ordering of metal cations about at least the tetrahedral or the octahedral sites of symmetry in the spinel lattice, said ordering of the metal cations with respect to said at least one of the tetrahedral or octahedral sites being an ionic ratios of whole numbers and comprising two different metal ions of differing charges, said solvent spinel being selected from the group consisting of:

(a) $Li^{+1}A_5^{+3}O_8$ in which A is Al, Fe or Ga,
(b) $Li_2^{+1}B^{+2}C_3^{+4}O_8$ in which B is Co, Zn, Mn, Cd, or Mg, and C is Ti or Ge, and
(c) $Li^{+1}D^{+3}Cr_4^{+3}O_8$ in which D is Al or Fe, said non-random, uniform cubic ordering of said metal cations forming an ordered system of oriented metal cations about said sites to form a substantially identical substructure around those ions of the spinel lattice which generate color and thereby impart a pure color to said pigment.

2. The inorganic pigment of claim 1 in which said solvent spinel is $LiFe_5O_8$.

3. The inorganic pigment of claim 1 in which said solvent spinel is $Li_2CoTi_3O_8$.

4. The inorganic pigment of claim 1 in which said solvent spinel is $LiFeCr_4O_8$.

5. The inorganic pigment of claim 1 in which said solute spinel is a spinel differing from the solvent spinel and corresponds to one of the following formulas:

$E^{+2}F_2^{+3}O_4$
$E_2^{+2}F^{+4}O_4$
$E^{+1}F_5^{+3}O_8$
$E_4^{+1}F_5^{+4}O_{12}$, or
$E_2^{+1}F^{+2}G_3^{+4}O_8$, in which E, F, and G are ions of metals having a valence indicated by the associated exponents, and in which each of E, F, and G of the solute spinel has an ionic radius no greater than about 1.1 angstroms, said solvent and solute spinels being present in all proportions forming a single phase solid solution.

6. The inorganic pigment of claim 5 in which E is a monovalent metal ion selected from the group consisting of Li, or a divalent metal ion selected from the group consisting of Mg, Mn, Fe, Co, Ni, Cu, Zn, and Cd; F is a divalent metal ion selected from the group consisting of Mg, Cu, Mn, Fe, Co, Ni, Zn, and Cd; or a trivalent metal ion selected from the group consisting of Al, Cr, Fe, Ga, In, La, and V; or a tetravelent metal ion selected from the group consisting of Ti, Sn, Mn, V, and Ge; and G is a tetravalent metal ion selected from the group consisting of Ti, Sn, Mn, V, and Ge, provided that the total positive charge of the metal ions in any of said formulas equals the total negative charge of oxygen to maintain electrical neutrality.

7. The inorganic pigment of claim 1 further containing as a diluent up to about 5% by weight of the pigment of a metal oxide.

8. The inorganic pigment of claim 1 in which said pigment comprises in mole percent from about 50% to about 99% of said solvent spinel and from about 1% to about 50% of said solute spinel.

9. The inorganic pigment of claim 1 in which both of said tetrahedral and octahedral sites have said uniform metal cation cubic ordering.

10. The multiple spinel solid solution of claim 1 containing both the solvent and solute spinels in which said solid solution generally corresponds to the formula $Li_2CoNi_2Ti_4O_{12}$.

11. The multiple spinel solid solution of claim 1 containing both the solvent and solute spinels in which said solid solution generally corresponds to the formula $LiAl_7CoO_{12}$.

12. The multiple spinel solid solution of claim 1 containing both the solvent and solute spinels in which said solid solution generally corresponds to the formula $LiAl_3CoCr_4O_{12}$.

13. The multiple spinel solid solution of claim 1 containing both the solvent and solute spinels in which said solid solution generally corresponds to the formula $LiAlCo_2Cr_4TiO_{12}$.

14. The multiple spinel solid solution of claim 1 containing both the solvent and solute spinels in which said solid solution generally corresponds to the formula $Li_4CoTi_5Al_2O_{16}$.

15. A multiple spinel inorganic pigment comprising a first spinel crystal structure and spinel-forming metal oxides of at least a second spinel, said first spinel and spinel-forming oxides being combined as a solid solution comprising a cubic spinel crystal structure of said first spinel and containing dissolved within said structure the spinel-forming metal oxides of said at least second spinel, said first spinel being that lithium-based variant of the cubic spinel phase having a non-random, uniform cubic ordering of metal cations about at least the tetrahedral or the octahedral sites of symmetry in the spinel lattice, said ordering of the metal cations with respect to said at least one of the tetrahedral or octahedral sites being in ionic ratios of whole numbers and comprising two different metal ions of differing charges, said solvent spinel being selected from the group consisting of:

(a) $Li^{+1}A_5^{+3}O_8$ in which A is Al, Fe or Ga,
(b) $Li_2^{+1}B^{+2}C_3^{+4}O_8$ in which B is Co, Zn, Mn, Cd, or Mg, and C is Ti or Ge, and
(c) $Li^{+1}D^{+3}Cr_4^{+3}O_8$ in which D is Al or Fe, said solute spinel being a spinel differing from the solvent spinel and corresponding to one of the following formulas:

$E^{+2}F_2^{+3}O_4$
$E_2^{+2}F^{+4}O_4$
$E^{+1}F_5^{+3}O_8$
$E_4^{+1}F_5^{+4}O_{12}$, or
$E_2^{+1}F^{+2}G_3^{+4}O_8$ in which E, F, and G are ions of metal having a valence indicated by the associated exponents, and in which each of E, F, and G of the solute spinel has an ionic radius no greater than about 1.1 angstroms, said solvent and solute spinels being present in all proportions forming a single phase solid solution, said non-random, uniform cubic ordering of said metal cations forming an ordered system of oriented metal cations about said sites to form a substantially identical substructure around those ions of the spinel lattice which generate color and thereby impart a pure color to said pigment.

16. The inorganic pigment of claim 15 in which E is a monovalent metal ion selected from a group consisting of Li, or a divalent metal ion selected from the group consisting of Mg, Mn, Fe, Co, Ni, Cu, Zn, and Cd; F is a divalent metal ion selected from the group consisting of Mg, Cu, Mn, Fe, Co, Ni, Zn, and Cd; or a trivalent metal ion selected from the group consisting of Al, Cr, Fe, Ga, In, La, and V; or a tetravelent metal ion selected from the group consisting of Ti, Sn, Mn, V, and Ge; and G is a tetravalent metal ion selected from the group consisting of Ti, Sn, Mn, V, and Ge, provided that the total positive charge of the metal ions in any of said formulas equals the total negative charge of oxygen to maintain electrical neutrality.

* * * * *